United States Patent
Taniguchi et al.

(10) Patent No.: US 6,478,101 B1
(45) Date of Patent: Nov. 12, 2002

(54) DRIVE UNIT FOR HYBRID VEHICLE

(75) Inventors: Takao Taniguchi, Anjo (JP); Kazumasa Tsukamoto, Anjo (JP); Satoru Wakuta, Anjo (JP); Shigeo Tsuzuki, Anjo (JP); Takeshi Inuzuka, Anjo (JP); Kenji Omote, Anjo (JP)

(73) Assignee: Aisin Aw Co., Ltd. (JP)

( * ) Notice: Subject to any disclaimer, the term of this patent is extended or adjusted under 35 U.S.C. 154(b) by 0 days.

(21) Appl. No.: 09/671,748

(22) Filed: Sep. 28, 2000

(30) Foreign Application Priority Data

Oct. 1, 1999 (JP) ............................................. 11-282177
Jun. 15, 2000 (JP) ....................................... 2000-179885

(51) Int. Cl.$^7$ ................................................. B60K 1/00
(52) U.S. Cl. ..................... 180/65.2; 180/65.3; 180/65.1
(58) Field of Search ............................... 180/65.2, 65.1, 180/65.3, 65.4, 65.6

(56) References Cited

U.S. PATENT DOCUMENTS 5,103,127 A * 4/1992 Peter ........................ 123/179.1
5,427,196 A * 6/1995 Yamaguchi et al. ........ 180/65.2
5,485,757 A * 1/1996 Foxwell .................. 73/862.321
5,773,904 A * 6/1998 Schiebold et al. ......... 180/65.2
5,789,823 A * 8/1998 Sherman .................... 180/65.2
5,833,022 A * 11/1998 Welke ....................... 180/65.2
6,258,001 B1 * 7/2001 Wakuta et al. ............. 192/3.28

FOREIGN PATENT DOCUMENTS

| JP | 05-030605 | 2/1993 |
| JP | 09-215270 | 8/1997 |
| JP | 09-238436 | 9/1997 |

* cited by examiner

Primary Examiner—Robert P. Olszewski
Assistant Examiner—James S. McClellan
(74) Attorney, Agent, or Firm—Lorusso & Loud (57) ABSTRACT

To reduce the axial dimension and size of a drive train for a hybrid vehicle, a rotor is supported within a recess formed in the end face of the a crankshaft and is further supported by the front cover of the torque converter. As a result, compared with drive trains which have a fixed member extending from the motor housing to support the rotor, the axial dimension and size of the drive train are reduced.

20 Claims, 4 Drawing Sheets

DRIVE UNIT FOR HYBRID VEHICLE

BACKGROUND OF THE INVENTION

1. Field of the Invention

The invention relates to a drive train connecting an engine and a motor in a vehicle, and more specifically to a hybrid vehicle drive train having a motor integrated with an automatic transmission or a manual transmission into a single unit.

2. Description of the Related Art

Japanese Patent Application No. HEI 9-215270, Japanese Patent Application No. HEI 9-23846 and Japanese Patent Application No. HEI 5-30605 all disclose parallel type hybrid vehicle drive trains. This type of hybrid vehicle drive train is provided with an engine and a motor/generator in a transmission. Driving forces of the engine and the motor/generator are transmitted to the transmission during start and acceleration of the vehicle. The motor/generator also functions as a generator to assist the engine brake effect when driving down a hill and also regenerates braking energy, thereby improving gas mileage and reducing the amount of discharged exhaust gas.

In the drive trains disclosed by HEI 9-215270 and HEI 9-238436, a motor/generator is arranged between an engine and a transmission. Therefore, the axial dimension of the drive train is increased by the axial length of the motor/generator, and the size of the drive train is thereby increased.

In the drive train disclosed by HEI 9-215270, a rotor of the motor/generator is rotatably supported by a fixed member, e.g., a housing or the like. In this case, the fixed member needs to extend to nearby the rotor. Therefore, the axial dimension of the drive train is increased, and the size of the drive train is likewise increased.

Another method directly supports the rotor by the crankshaft of the engine without the fixed member, in which case the crankshaft is rotatably supported by plural supports, and the mass of the rotor connecting to the crankshaft is mainly supported by that support which is nearest to the rotor support. The nearest supporting portion and the center of gravity of the rotor are axially offset. Therefore, if the rotor is arranged on the crankshaft in an overhanging state, the mass of the rotor must be supported over a longer distance than the supporting portion. As a result, the crankshaft and the plural supports therefor are overstressed, and the engine is also adversely affected.

If the mass of the rotor must be supported over a longer distance than provided by the supporting portion mentioned above, the rotor tends to rotate eccentrically. Further, the rotor is directly supported by the crankshaft of the engine. Therefore, when the crankshaft rotates eccentrically due to the explosion vibrations of the engine, the rotor tends to also rotate eccentrically. To avoid contacting the rotor with a stator when the rotor rotates eccentrically, a greater gap between the rotor and the stator must be provided. As a result, the size of the motor/generator increases, and the efficiency of the motor/generator decreases.

In the drive train disclosed by HEI 5-30605, a motor/generator is arranged so as to bypass between a pump impeller and a turbine runner of a torque converter. A rotor of the motor/generator is supported by the torque converter cover. In this structure, when the converter cover is deformed by charge pressure and/or centrifugal pressure, the accuracy of centering of the rotor decreases.

SUMMARY OF THE INVENTION

In view of the above problems associated with the prior art, an object of the invention is to provide a hybrid vehicle drive train which minimizes the axial dimension of the drive train and the size of the drive train.

To achieve the foregoing object, the invention provides a drive train for a hybrid vehicle including an engine, a motor having a stator and a rotor, and a transmission receiving driving forces from the engine and the motor, wherein the rotor is supported by an output shaft of the engine and an input member of the transmission.

The rotor preferably has a shaft portion on a rotational center thereof, and the shaft portion of the rotor is supported by the output shaft of the engine, with the shaft portion contacting the output shaft over an axially narrow area.

In a preferred embodiment a recess is formed in an end face of the output shaft of the engine, and a convex portion is formed on an outer surface of the shaft portion of the rotor, wherein the shaft portion of the rotor is inserted into the recess, with the convex portion in contact with a wall surface defining the recess.

The transmission preferably includes a fluid transmission unit having a turbine runner, a pump impeller and a cover, with the cover serving as the input member and being arranged so as to cover the turbine runner and the pump impeller, and the rotor being further supported by a portion of the cover.

The fluid transmission unit preferably has a center piece on a rotational center thereof, and the rotor is centered by the center piece.

A flex plate is preferably arranged between the output shaft of the engine and the rotor to transmit driving force. The flex plate extends to a radially outer side of the stator of the motor, and a sensor detects the extended portion of the flex plate to determine phase of the rotor of the motor.

Figure 3:
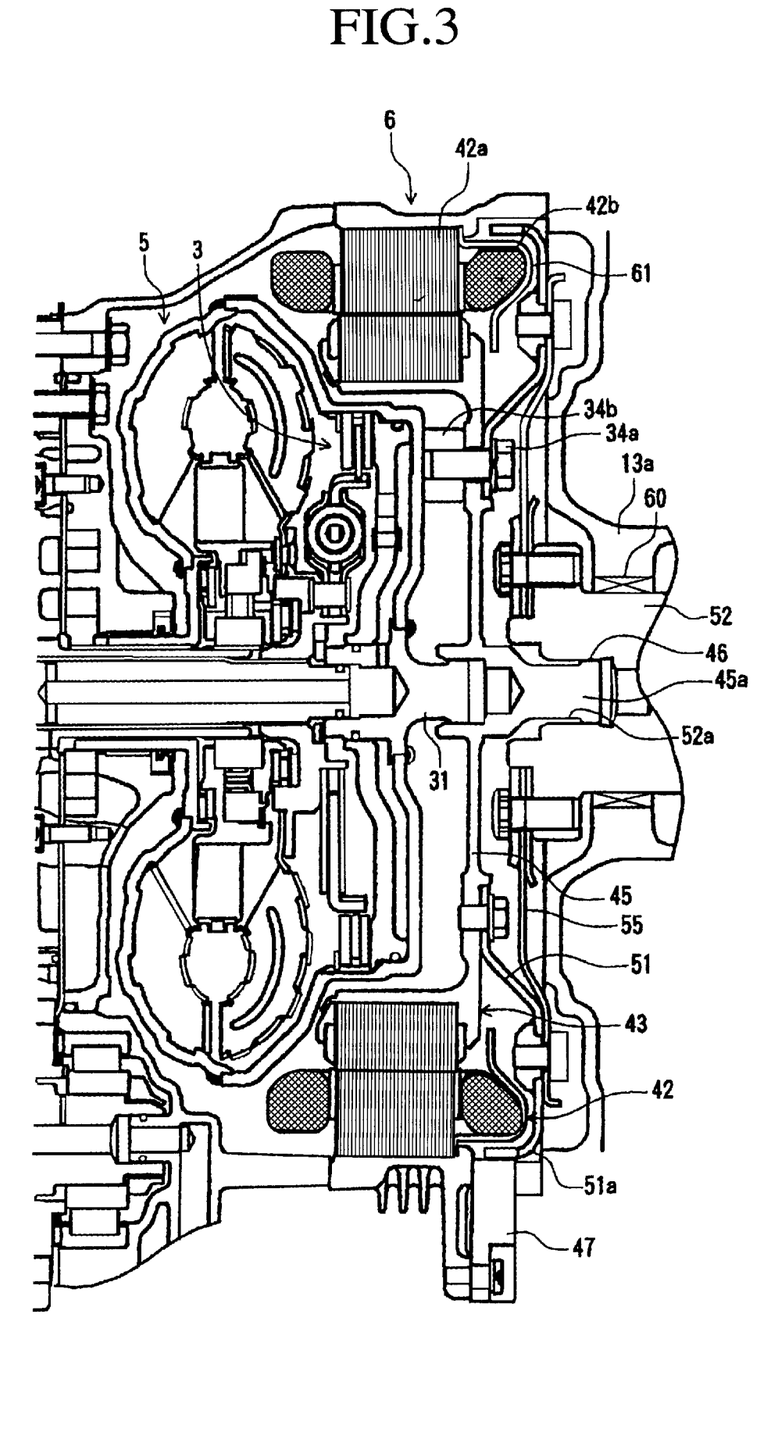
FIG. 3 is a cross-sectional view of a motor/generator according to a modification of the embodiment of FIG. 1.

As shown in FIG. 3, a shaft bushing rotatably supports an end portion of the output shaft of the engine. A recess is formed in the end of the output shaft, and the rotor has a centered rotor shaft inserted into the recess and the rotor is thereby supported by the output shaft, with at least part of the supported shaft portion of the rotor axially overlapping the shaft bushing.

The shaft portion of the rotor is in contact with the output shaft of the engine only over an axially narrow area thereof. Therefore, even if the output shaft rotates eccentrically due to vibrations of the engine, only the contacting position moves and transmission of the eccentric rotation from the output shaft to the shaft of the rotor is minimized.

The rotor is supported by the output shaft via the rotor shaft which is received in the recess of the output shaft. The output shaft is supported by the shaft bushing overlapping with the supported shaft portion of the rotor.

In the invention, the motor is not limited to a motor which converts electrical energy to rotational motion, and may be a generator which converts rotational motion to electrical energy. The engine is a unit which converts fuel combustion energy to rotational motion, and may be a gasoline engine, a diesel engine or the like. The shaft bushing is not limited to a roller bearing, and may be any shaft support, e.g., slide bearing including metal bearing, journal bearing and hydrostatic bearing or the like, oil retaining bearing or gas bearing or the like.

Because the rotor is supported by the output shaft of the engine and the input member of the transmission, a fixed member for rotationally supporting the rotor is not necessary so that the axial dimension and overall size of the drive train can be reduced.

The shaft portion of the rotor is supported by the output shaft of the engine with allowance for movement relative thereto by contact with the output shaft over an axially narrow area thereof. Therefore, the transmission of the vibrations of the engine to the rotor can be reduced. Accordingly, the gap between the rotor and the stator can be reduced so that the efficiency as a motor can be increased.

Because the rotor is supported by the portion of the cover opposed to the rotor on the radially outer side of the cover, the degree of deformation by hydraulic pressure on the radially outer side of the cover is smaller than that in the center portion (the radially inner side). Therefore, even if the cover is deformed by hydraulic pressure, the centering accuracy of the rotor is not compromised.

Because the sensor for detecting the phase of the rotor of the motor is arranged on the radially outer side of the motor and detects the extended portion of the flex plate, the sensor can be sufficiently supported directly by a fixed member, e.g., the motor housing or the like, so that the axial dimension of the gear train can be reduced. Also, in case that the phase of the rotor of the motor is determined by detection of the flex plate, the phase can be detected without providing another member for detection by the sensor.

Because the output shaft is supported by the shaft bushing which is axially overlapped with the supported portion of the rotor, forces acting on the output shaft by supporting the rotor can be directly borne by the shaft bushing so that the affects from the rotor to the output shaft can be reduced.

BRIEF DESCRIPTION OF THE DRAWINGS

The invention will be described in conjunction with the following drawings in which like features are designated with like reference characters, and wherein.

DETAILED DESCRIPTION OF THE INVENTION

The invention will be further understood from the following detailed description of preferred embodiments with reference to the accompanying drawings.

Figure 1:
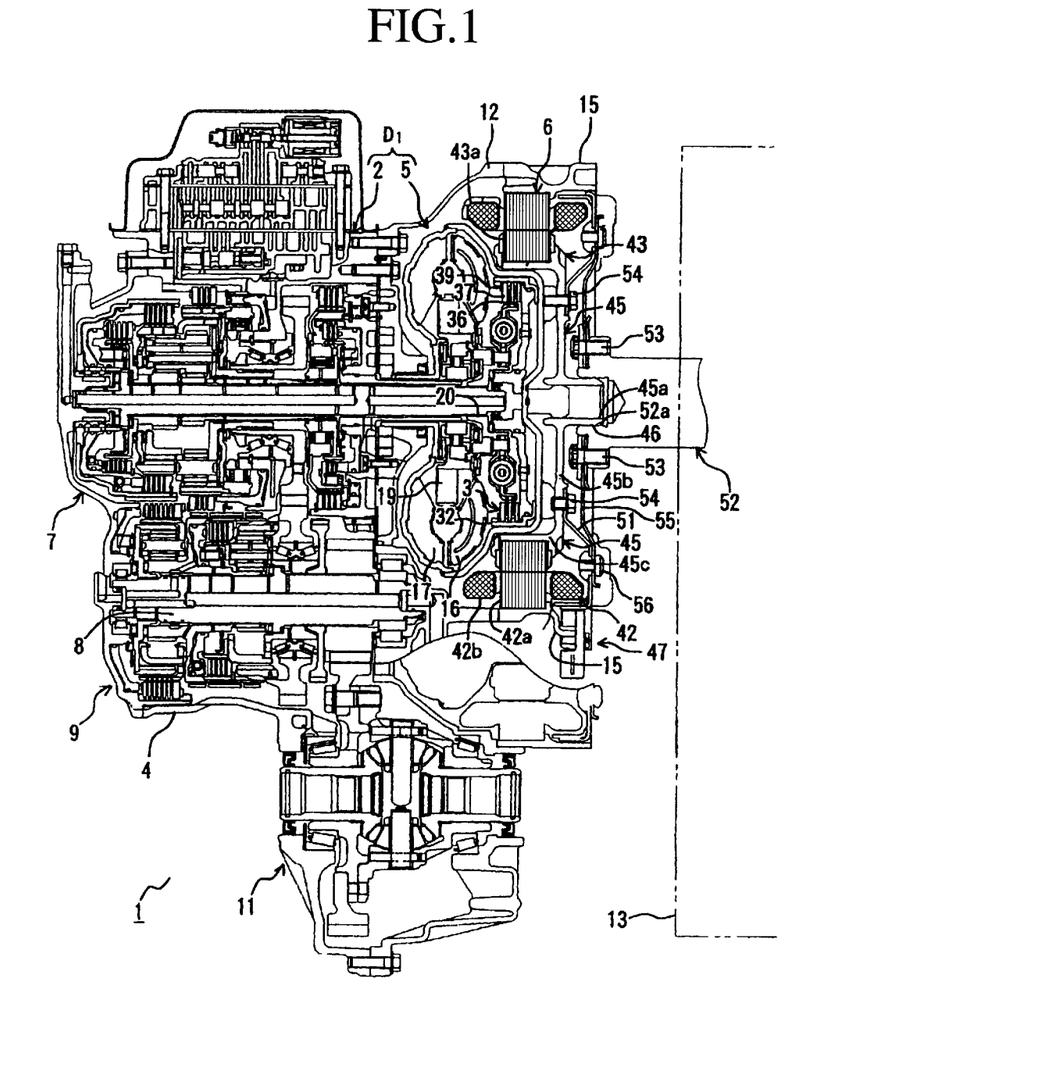
FIG. 1 is a cross-sectional view of an embodiment of a hybrid vehicle drive train according to the invention.
Figure 2:
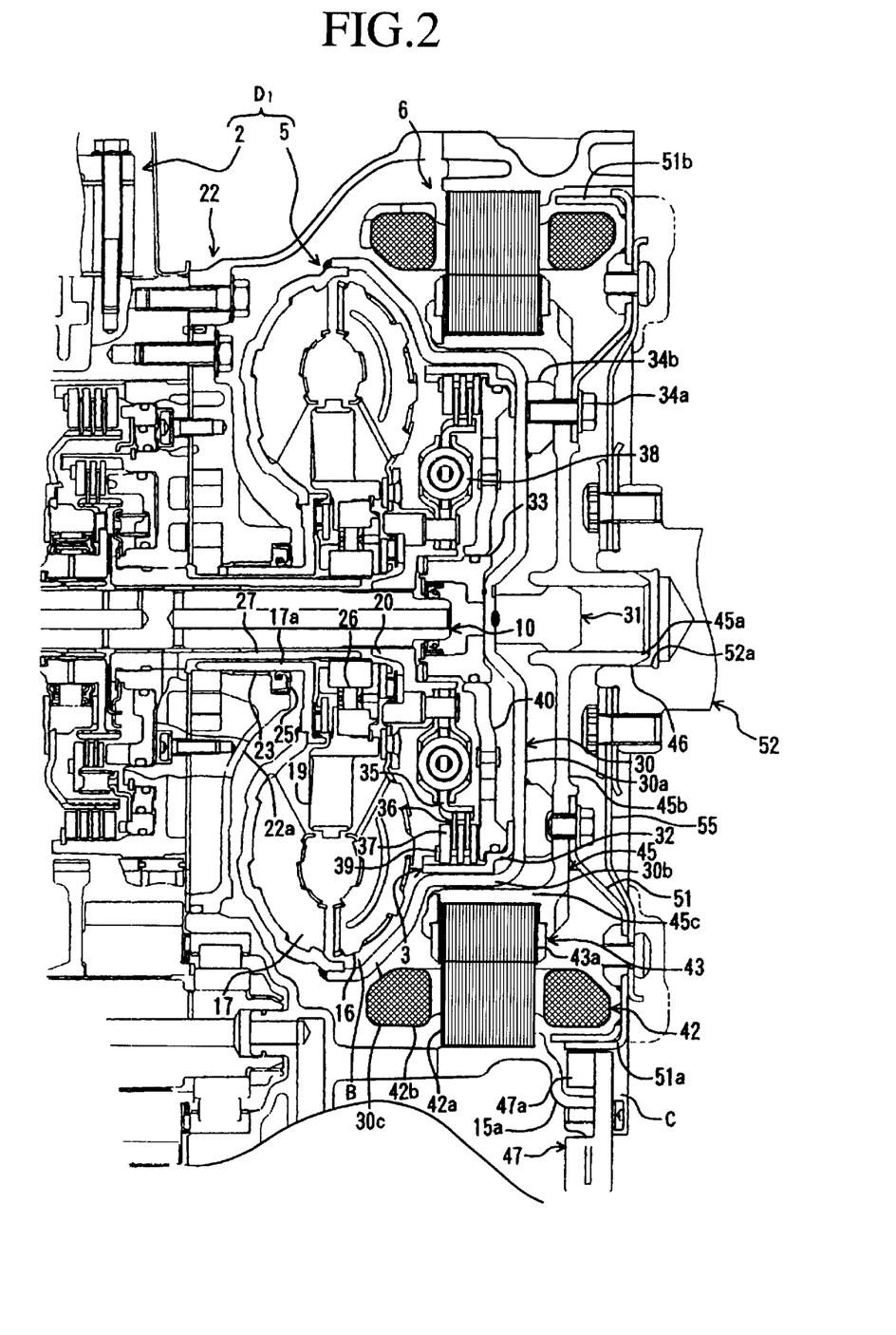
FIG. 2 is a cross-sectional view of a torque converter and a motor/generator of the embodiment of FIG. 1.

As shown in FIGS. 1 and 2, a hybrid vehicle drive train 1 has a motor/generator 6 which is connected to a torque converter of a conventional automatic transmission A/T. The hybrid vehicle drive train includes an internal combustion engine 13, e.g., a gasoline engine, the motor/generator 6, e.g., a brushless DC motor or the like which is housed in a motor housing 15, and the automatic transmission D1 which receives torque from the engine 13 and the motor/generator 6. That is, the hybrid vehicle drive train 1 has the motor/generator 6 and the automatic transmission D1 arranged in sequence from the engine side.

A crankshaft (output shaft) 52 extends from the engine 13 to the motor/generator 6. A flexible drive plate 55 is fixed with bolt 53 to the end portion of the crankshaft 52. A flexible input plate 51, which is arranged at the opposite side of the drive plate 55, is fixed with bolt 56 to the end portion of the drive plate 55. These plates form a flex plate 51,55. The end face of the crankshaft 52 of the engine 13 includes a recess(bore) 52a. Details of the recess 52a will be described later.

The motor/generator 6 has a stator 42 and a rotor 43. The rotor 43 is formed of multiple laminated plates 43a, each of which is a permanent magnet, and a rotor plate 45 which is fixed to and supports the laminated plates 43a. The rotor plate 45 includes a pipe-like rotor shaft portion 45a which is arranged at the rotational center of the rotor plate 45, a rotor disc 45b which is connected to the shaft portion 45a and radially extends along the drive plate 55, and a cylindrical retention portion 45c which is connected to the outer rim of the disc 45b. The retention portion 45c retains the laminated plates 43a aligned in the axial direction. As shown in FIG. 2, an annular convex portion 46 forms an axially narrow area on the outer surface of the shaft portion 45a, adjacent its one end. The shaft portion 45a is inserted into the recess (bore) 52a of the crankshaft 52, and is supported for relative movement therein by contact between the convex portion 46 and the inner surface of the recess 52a of the crankshaft 52. Therefore, the shaft portion 45a is centered when the motor housing 15 is appropriately aligned.

While FIGS. 1 and 2 show the recess 52a formed in the crankshaft 52 and the shaft portion 45a of the rotor 43 inserted into the recess 52a, the structure is not so limited. The recess may be formed in the shaft portion 45a of the rotor 43 and the crankshaft 52 inserted into that recess.

The inner side of the input plate 51 is fixed with bolt 54 to the disk portion 45b. The flex plate 51, 55, including the input plate 51 and the drive plate 55, is arranged between the crankshaft 52 of the engine and the rotor 43, and is structured so as to transmit the torque.

Further, a plurality of magnet cores 42a, which is fixed to the motor housing 15, and the laminated plates 43a oppose each other with a slight gap therebetween. The stator 42 includes the magnet cores 42a surrounded by a coil 42b. The stator 42 is made as large as possible, without lowering the minimum bottom height of the vehicle, to improve polarity and to ensure a predetermined output. The laminated plates 43a of the rotor 43 must have strength sufficient to withstand the centrifugal force.

A part of the flex plate 51, 55 is extended to the radially outer side of the stator 42 of the motor/generator 6. A sensor 47 is arranged so as to axially overlap the motor/generator 6 on the radially outer side of the motor/generator, i.e., opposed to the flex plate 51, 55. The sensor 47 detects the phase of the rotor 43 of the motor/generator 6 by detecting the extended portion of the flex plate 51,55. The sensor 47 is arranged to face radially outward on the end of the engine side of the motor housing 15. A detecting portion 47a of the sensor 47 is arranged on a concave portion C which is formed as an projection 15a on the motor housing 15. The input plate 51 integrally connecting to the disk portion 45b of the rotor 43 is extended in the radial outward direction, and bent to cover the radially outer side of one coil 42b of the stator 42 at the end portion thereof. The radially outward portion 51a of the input plate 51 and a plate 51b, which is integrally welded to the radially outward portion 51a of the input plate 51, form the structure monitored by the sensor 47. The sensor 47 correctly detects the rotational position of the rotor 43 and controls the timing of the current flowing to the stator 42 to ensure proper performance of the motor/generator 6. Further, when the vehicle starts, the reverse rotation of the rotor 43 can be reliably prevented, and since a dedicated space is not needed to mount the sensor 47, there is no need to increase the length of the drive train.

The automatic transmission D1, e.g., front engine front drive type transmission, includes a torque converter 5 as a fluid transmission unit and a multiple shift mechanism 2.

The multiple shift mechanism 2 includes a main shift mechanism 7 arranged on an input shaft 10, a sub shift mechanism 9 arranged on a counter shaft 8 and a differential unit 11 arranged on a front axle. The input shaft 10 and the counter shaft are arranged in parallel with each other. The automatic transmission D1 is contained in integral transmission case 4.

As shown in FIG. 2, the torque converter 5 is contained in a converter housing 12 and includes a lock-up clutch 3, a turbine runner 16, a pump impeller 17, a stator 19 and a front cover 30. The front cover 30 serves as an input member of the shift mechanism and covers the lock-up clutch 3 and the turbine runner 16. A center piece 31 is fixed at the rotational center of the front cover 30 on the outer side thereof, and a lock-up piston hub 33 is fixed to the rotational center of the front cover 30 on the inner side thereof.

The front cover 30 includes radially inner section 30a, a center section 30b and radially outward section 30c. The radially inner section, which has a disk-like shape, is arranged to conform to the disk portion 45b of the rotor 43. The center section 30b, which is shaped cylindrically, is connected to the outer periphery of the radially inner section 30a and is arranged to conform to the retention portion 45c. The radially outward section 30c, which is fixed to the pump impeller 17, is connected to the center section 30c and conforms to the shape of the turbine runner 16. The stator 42 and the rotor 43 are arranged substantially radially aligned with and radially outward of the center section 30b of the front cover 30.

The center piece 31 is axially inserted into the shaft portion 45a of the rotor 43 for relative movement therein, and centers the rotor 43 to the torque converter 5. An outer shell of the torque converter 5, i.e., the front cover 30, is deformed by change of the centrifugal hydraulic pressure and charge hydraulic pressure, especially axially at its rotational center. Therefore, the center piece 31 moves axially. While the center piece 31 moves axially, it does not affect the supporting accuracy of the rotor 43, since the center piece 31 is supported, with allowance for relative movement, by the shaft portion 45a of the rotor 43.

The rotor 43 is fixed to the radially inner section 30a of the front cover 30. Namely, the disk portion 45b of the rotor 43 is fixed with bolts 34a and nuts 34b to the radially inner section 30a of the front cover 30. Therefore, as described above, since the deformation of the torque converter 5 occurs to a greater extent at the rotational center thereof, and less so at the radially outer portion of the front cover 30, the affect of deformation of the torque converter 5 on the supporting accuracy of the rotor 43, which is fixed at the radially outer portion of the front cover 30, is small.

As shown in FIG. 2, a lock-up piston hub 33 is cylindrically formed and surrounds the input shaft 10. An oil seal is arranged between the lock-up piston hub 33 and the input shaft 10.

As described above, while the rotor 43 is supported for relative movement by the crankshaft 52, axial movement of the rotor 43 is restricted by the flex plate including the drive plate 55 and the input plate 51.

Since the crankshaft 52 and the shaft portion 45a of the rotor 43 contact each other only at the narrow convex portion 46, even if the crankshaft 52 rotates eccentrically due to vibrations of the engine, only the contacting position moves. Therefore, the transmission of the eccentric rotation from the crankshaft 52 side to the shaft portion 45a side of the rotor 43 is reduced.

The lock-up clutch 3 is arranged radially inward of the center section 30b of the front cover 30 and includes a drum 32 which is fixed to the radially inner section 30a of the front cover 30 and which is coaxial with the center section 30b. Axially extending splines are formed on the inner surface of the drum 32 and support a plurality of outer frictional plates 37 which are retained by a snap ring 39. A moveable piston plate 40 is arranged between inner surface of the drum 32 and outer surface of the lock-up piston hub 33. A hub 20 is splined to the input shaft 10 near the lock-up piston hub 33 and supports a hub 35. Damper springs 38 are provided between the hub 20 and the hub 35 and absorb rotational shocks. The hub 35 is coaxial with the drum 32, and has a splined surface which engages a plurality of inner friction plates 36. The outer frictional plates 37 and the inner frictional plates 36 constitute a multiple disk clutch.

The piston plate 40 has orifices formed therein so that hydraulic pressure can flow between oil chambers on opposing sides of the piston plate 40 while being throttled. The piston plate 40 is moved by changing the direction of oil flow, and engagement, release and slip of the frictional plates 36, 37 can be controlled by controlling pressing force (hydraulic pressure) applied to the outer frictional plates 37 by the piston plate 40.

The lock-up clutch 3 has a diameter smaller than that of the torus which constitutes the outer shell of the turbine runner 16 and the pump impeller 17 of the torque converter 5. Specifically, the lock-up clutch 3 is arranged such that the drum 32 is positioned in substantially the radial center of the torus.

While the lock-up clutch 3 has a diameter sufficiently small to be contained radially inward of the motor/generator 6, because the lock-up clutch is a multiple disk clutch, when both of the motor/generator 6 and the engine 13 are in drive, the lock-up clutch 3 reliably transmits their outputs to the input shaft 10.

The turbine runner 16 is connected to the hub 20 and rotates integrally with the input shaft 10.

The pump impeller 17 is fixed to the radially outer portion 30c of the front cover 30, and the radially inner section of the front cover 30a is fixed to a hub 17a.

A sleeve is arranged between the hub 17a and the input shaft 10 and surrounds the input shaft 10. An inner cage of a one-way clutch 26 is fixed on the end portion of the sleeve 27. The one-way clutch is connected to the stator 19.

An oil pump 22 is arranged between the torque converter 5 and the multiple shift mechanism 2. The hub 17a is rotatably supported via a bushing 23 on the inner surface of a pump case 22a. That is, the disk portion 45b of the rotor 43 is supported via the bolts 34a, the nuts 34b, the front cover 30 and the hub 17a by the pump case 22a. The span between the two supports of the rotor 43, i.e., the end of the crankshaft 52 and the pump case 22a, is larger so that even if the crank shaft 52 eccentrically rotates, the vibration of the disk portion 45b of the rotor 43 is small. As a result, the gap between the rotor 43 and the stator 42 can be reduced so that the efficiency as the motor/generator can be increased. Further, an oil seal 25 is arranged between the pump case 22a and the hub 17a. The sleeve 27 is extended from the oil pump 22.

FIG. 3 shows another embodiment which is a partial modification of the previously described embodiment. The same reference numerals are used and description is omitted for components and features identical to those in the previously described embodiment. In this embodiment, the crankshaft 52 has a deeper recess (bore) 52a than that of the previous embodiment. The end portion of the crankshaft 52 is rotatably supported via a metal shaft bushing 60, by the engine 13a.

The shaft portion of the rotor 43, i.e., the shaft portion 45a provided at the rotational center of the supporting plate 45, projects to the engine side. The projecting portion of the shaft portion 45a is solidly formed, and the annular convex portion 46 is formed in an axially narrow area on the outer surface near the end of the shaft portion 45a. The shaft portion 45a of the rotor 43, which is longer than that of the previous embodiment, is inserted in recess 52a of the crankshaft 52, and the convex portion 46 contacts with the inner surface of the recess 52a to provide the supporting function.

The recess 46 of the crankshaft 52 supporting the shaft portion 45a of the rotor 43, at least partially axially overlaps the shaft bushing 60 of the crankshaft 52.

The convex portion 46 of the shaft portion 45a is arranged near the shaft bushing 60 of the crankshaft 52. Since the shaft portion 45a of the rotor 43 is directly supported via crankshaft 52 by the shaft bushing 60, the increased mass of the rotor 43 of the motor/generator 6 does not affect the crankshaft 52. That is, since the rotor 43 is directly supported by the shaft bushing 60, the force from the rotor 43 acting on the crankshaft only slightly affects the crankshaft 52. The portion of the crankshaft 52 supporting the shaft portion 45a is, in turn, supported by the shaft bushing. Therefore, the eccentric rotation of the crankshaft 52 due to vibrations of the engine is not transferred to the rotor 43.

In FIG. 3, 61 is a shielding plate which shields the leaked magnetic flux from the motor/generator 6. The shielding plate 61, which is supported by contacting the magnetic cores 42a on one side, is axially extended from the magnetic cores 42a along the radially outer surface of the stator coil 42b and is further extended around the stator coil 42b. As a result, with regard to the leaked magnetic flux from the stator coil 42b, the stator coil 42b, the shielding plate 61 and the magnetic core 42a form a closed loop. Therefore, the leaked magnetic flux is prevented from flowing to another portion, and the sensor 47 is protected against detecting inaccuracy and errors in operation based on the affect of the leaked magnetic flux.

Next, operation of the hybrid vehicle drive train 1 will be described.

With the vehicle stopped, when the ignition switch (not shown) is ON and the driver depresses the accelerator pedal (at low throttle opening), current flows from the battery (not shown) to the motor/generator 6 which functions as a motor. That is, when a controller (not shown) sends current with appropriate timing to the coil 42b of the stator 42, based on the signal from the sensor 47 (the position of the rotor 43), the rotor 43 rotates in a forward direction with high efficiency. The rotational power of the rotor 43 is transmitted to the torque converter 5 via the supporting plate 45, bolts 34a and nuts 34b. Furthermore, the rotational power is transmitted to the input shaft 10 after increase in a predetermined torque ratio in the torque converter 5.

When the vehicle starts in motion, a fuel injection system of the engine 13 is stopped and the engine 13 is off. The vehicle starts in motion under driving power of the motor/generator 6 only. As described above, the supporting plate 45 is rotated so that the crankshaft 52 is rotated via the input plate 51 and drive plate 55. As a result, pistons of the engine 13 are driven with compressing and releasing of air in cylinder chambers. The motor/generator 6 outputs high torque at low speeds, and the torque, increased by the torque converter 5, combines with the high torque ratio in the first speed of the automatic transmission unit. As a result, the vehicle starts in motion and runs smoothly at a predetermined torque.

Then, with the vehicle moving at a relatively low speed immediately after starting, when the throttle is depressed to an extent equal to or greater than a set opening, to accelerate or to climb hills, the fuel injection system activates, the motor/generator 6 functions as a starter motor, and a spark plug is ignited to start the engine 13. As a result, the crankshaft 52 rotates and the rotational driving force thereof is transmitted to the supporting plate 45 via the drive plate 55 and the input plate 51. The driving force of the engine 13 and the driving force of the motor/generator 6 functioning as a motor are combined and transmitted to the torque converter 5 so that the vehicle runs with a large amount of driving force. At this time, the multiple shift mechanism 2 shifts up to transmit the rotation to the driving wheels at the desired speed.

Then, when the vehicle is running at a high speed, the motor/generator 6 is operated under no load (the motor output is controlled so as to cancel out torque generated from reverse power generated by the motor) such that the motor/generator 6 slips. As a result, the vehicle runs with driving power of the engine 13 only.

In case that the state of charge (SOC) of the battery is low, the motor/generator 6 functions as a generator to regenerate energy. When driving with the internal combustion engine 13 or when the internal combustion engine 13 is assisted by the motor, the piston plate 40 moves with change in the direction of the converter pressure so as to engage the multiple plate clutch (the outer frictional plates 37 and the inner frictional plates 36). Accordingly, the torque transmitted to the front cover 30 is then transmitted directly to the input shaft 10 via the drum 32, the outer frictional plates 37, the inner frictional plates 36, the hub 35, the damper springs 38 and the turbine hub 20, by-passing the hydraulic connection through the torque converter 5.

When there is excess output from the internal combustion engine 13 because of constant low speed in downhill running or the like, the motor/generator 6 functions as a generator and charges the battery, depending on the SOC of the battery. Specifically, when the engine brake operates running downhill, the regenerated power from the motor/generator 6 which is functioning as a generator increases so that a sufficient braking effect is provided. Also, when the driver depresses the foot brake to reduce speed of the vehicle, the regenerated power from the motor/generator 6 further increases, and the motor/generator 6 operates as a regenerative brake, regenerating the inertia energy of the vehicle as electrical power and decreasing the braking required of the frictional brake, thereby decreasing the energy dissipation as heat. Also, when the vehicle is running at middle speed, the motor/generator 6 is in the regenerative state to allow the engine 13 to operate with high output and high efficiency. As a result, the engine efficiency can increase and running powered by the motor can increase, based on charging of the battery in regeneration, so that overall energy efficiency is increased.

When the vehicle is stopped at a traffic light or the like, the motor/generator 6 is stopped and the fuel injection system is off so that the internal combustion engine 13 is also stopped. That is, the idling of the conventional engine is eliminated. Also, when the vehicle takes off from a stand-still, the vehicle is initially started only by the motor driving force of the motor/generator 6. Immediately thereafter, while at a relatively low speed, the engine is started by the motor driving force. Assist from the motor driving force of the motor/generator 6 eliminates sudden fluctuations in driving force of the engine, thereby making operation smooth. Then, when engine braking is necessary or when braking to a stop, the motor/generator 6 functions as a regenerative brake, regenerating vehicle inertia energy as electrical energy. Also, when the engine efficiency is low, i.e., when the engine operates under low load or extremely low load, the vehicle is run under power of the motor. With this combination, the hybrid vehicle is able to achieve low fuel consumption and a decrease in exhaust gas.

In the foregoing embodiment, FF (front engine/front wheel drive) type automatic transmission D1 is illustrated as an example. However, the invention is not limited to such FF type automatic transmissions and may also be applied to FR (front engine/rear wheel drive) type automatic transmissions and to CVT type automatic transmissions. Further, the invention may also be applied to a manual transmission D2 as shown in FIG. 4.

Figure 4:
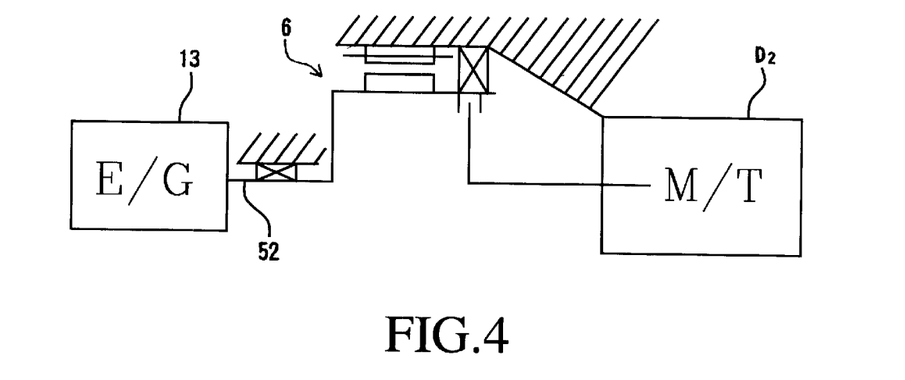
FIG. 4 is a diagram of an embodiment of a drive train having a manual transmission according to the invention.

In the embodiment of FIG. 4, the motor/generator 6, including the stator 42 and the rotor 43, is arranged on the radially outer side of the torque converter 5, more precisely, on the radially outer side of the center section 30b of the front cover 30, so as to axially overlap with the torque converter 5. Therefore, compared with a drive train which does not have overlap of a motor/generator with a torque converter, the axial dimension can be reduced and the size of the drive train can be reduced.

Also, in this embodiment, a fixed member for rotationally supporting the rotor 43 is not necessary so that the axial dimension and size of the drive train can be reduced.

In the internal combustion engine 13, the pistons are reciprocated by the force of explosion within the cylinder chamber, thus rotating the crankshaft. As a result, the crankshaft tends to eccentrically rotate. However, in the present invention, the crankshaft 52 and the supporting plate 45 are connected with each other via the input plate 51 and the drive plate 55 etc so that the eccentric rotation is absorbed by bending of these plates 51, 55. Also, the shaft portion 45a of the supporting plate 45 contacts the crankshaft 52 only at narrow annular convex portion 46 and, in this manner, the transmission of the explosion vibrations of the internal combustion engine 13 to the supporting plate 45 can be reduced. Accordingly, the gap between the rotor 43 and the stator 42 can be reduced so that the efficiency as a motor/generator can be increased.

As shown in FIG. 3, the convex portion 46 of the shaft portion 45a, which is supported by the crankshaft 52, is arranged so as to axially overlap the shaft bushing 60 supporting the crankshaft 52. As a result, the force received by the crankshaft 52 from the rotor 43 can be directly supported by the shaft bushing 60 so that the affect on the rotor 43 by the crankshaft 52 can be reduced. Also, the portion of the crankshaft 52 supporting the shaft portion 45a is directly supported by the shaft bushing 60. Therefore, the eccentric rotation of the crankshaft 52 due to the explosion vibrations of the engine is not transmitted to the rotor 43. The accuracy of centering of the rotor 43 is increased so that the efficiency of the motor/generator 6 can be further improved by reducing the air gap.

The disk portion 45b of the rotor 43 is fixed to the radially inner section 30a of the front cover 30. The rotor 43 is centered by the center piece 31 which is axially movable. Therefore, with this combination, even if the front cover 30 is deformed by hydraulic pressure provided to a converter chamber B, the accuracy of centering the rotor 43 does not decrease.

In this embodiment, hydraulic pressure, i.e., charge pressure or centrifugal pressure, acts within the converter chamber B formed between the outer shell of the front cover 30 and the pump impeller 17. However, the front cover 30 is stepped at the center section 30b which extends axially, and is thereby strengthened and difficult to deform.

In this embodiment, the sensor 47, which detects the phase of the rotor 43, is arranged on the radially outer side of the motor/generator 6 and detects the extension of the flex plate 51, 55. Therefore, the sensor 47 can be sufficiently supported directly by a fixed member, e.g., the motor housing 15 or the like. A fixed member for supporting the sensor 47 is not necessary along the flex plate 51, 55 or the rotor 43 so that the axial dimension of the unit can be reduced. Also, when the phase of the rotor 43 of the motor/generator 6 is detected by using the flex plate 51, 55, the phase can be detected without an additional member for detection by the sensor 47.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

INCORPORATION BY REFERENCE

The entire teachings of Japanese Applications Hi 1-282177, filed Oct. 1, 1999, and 2000-179885, filed Jun. 15, 2000, inclusive of their specifications, claims and drawings, are incorporated herein by reference.

What is claimed is:

1. A drive train for a hybrid vehicle having an engine with an output shaft, said drive train comprising:
   a motor having a stator and a rotor, said rotor comprising laminated plates and a supporting plate supporting the laminated plates;
   a transmission receiving a driving force from the engine and the motor; wherein:
   the supporting plate of the rotor is directly supported by the output shaft of the engine and an input member of the transmission.

2. The drive train for a hybrid vehicle according to claim 1 wherein:
   the rotor further comprises a shaft portion on a rotational center thereof and fixed to an inner periphery of the supporting plate; and
   wherein:
      the shaft portion of the rotor is supported by and axially overlaps the output shaft of the engine, with the shaft portion contacting the output shaft over an axial distance which is a minor portion of the axial overlap.

3. The drive train for a hybrid vehicle according to claim 2 further comprising:
   a recess formed in an end face of the output shaft of the engine; and
   a convex portion formed on an outer surface of the shaft portion of the rotor, said convex portion defining the axial distance of said contacting; and wherein:
      the shaft portion of the rotor is inserted into the recess, with the convex portion in contact with a wall surface defining said recess.

4. The drive train for a hybrid vehicle according to claim 3 wherein:
   the transmission includes a fluid transmission unit having a turbine runner, a pump impeller and a cover, said cover serving as the input member and being arranged so as to cover the turbine runner and the pump impeller; and wherein the rotor is further supported by a portion of the cover.

5. The drive train for a hybrid vehicle according to claim 4 wherein:

the fluid transmission unit has a center piece on a rotational center thereof; and the rotor is centered by the center piece.

6. The drive train for a hybrid vehicle according to claim 2 wherein:

the transmission includes a fluid transmission unit having a turbine runner, a pump impeller and a cover, said cover serving as the input member and being arranged so as to cover the turbine runner and the pump impeller; and wherein the rotor is further supported by a portion of the cover.

7. The drive train for a hybrid vehicle according to claim 6 wherein:

the fluid transmission unit has a center piece on a rotational center thereof; and the rotor is centered by the center piece.

8. The drive train for a hybrid vehicle according to claim 1 wherein:

the transmission includes a fluid transmission unit having a turbine runner, a pump impeller and a cover, said cover serving as the input member and being arranged so as to cover the turbine runner and the pump impeller; and wherein the rotor is further supported by a portion of the cover.

9. The drive train for a hybrid vehicle according to claim 8 wherein:

the fluid transmission unit has a center piece on a rotational center thereof; and the rotor is centered by the center piece.

10. The drive train for a hybrid vehicle according to claim 1 further comprising:

a flex plate arranged between the output shaft of the engine and the rotor to transmit driving force, said flex plate extending to a radially outer side of the stator of the motor; and a sensor for detecting a phase of the rotor of the motor said sensor arranged on a radially outer side of the motor for detecting the flex plate.

11. The drive train for a hybrid vehicle according to claim 2 further comprising:

a shaft bushing for rotatably supporting an end portion of the output shaft of the engine; and a recess formed in an end face of the output shaft; and wherein:

the rotor has a shaft portion at a rotational center thereof;

the shaft portion of the rotor is inserted into said recess and is supported by the output shaft; and at least one part of a supported portion of the shaft portion of the rotor axially overlaps the shaft bushing.

12. The drive train for a hybrid vehicle according to claim 1 wherein said supporting plate comprises, integrated into a unitary structure, a rotor shaft, a retention portion, and a disk section connecting said shaft and said retention portion.

13. The drive train for a hybrid vehicle according to claim 12 wherein said rotor shaft of said supporting plate is supported by the output shaft of the engine.

14. The drive train for a hybrid vehicle according to claim 1 wherein said rotor comprises a hollow shaft portion having inner and outer cylindrical surfaces and wherein said outer cylindrical surface is in direct contact with and supported by the output shaft of the engine and said inner cylindrical surface is in direct contact with and supported by a member fixed to and extending axially from said input member of the transmission.

15. A drive train for a hybrid vehicle having an engine with an output shaft, said drive train comprising:

a motor including a stator and a rotor, said rotor comprising laminated plates and a supporting plate supporting the laminated plates;

a transmission receiving driving forces from the engine and said motor;

and wherein:

said supporting plate of said rotor is directly centered by direct radial contact with the output shaft of the engine and an input member of the transmission.

16. A drive train for a hybrid vehicle according to claim 15 wherein said supporting plate comprises, as an integral single piece construction, a rotor shaft, a retention portion and a disk section connecting said rotor shaft with said retention portion.

17. The drive train for a hybrid vehicle according to claim 16 wherein said supporting plate is centered by radial contact of said rotor shaft with the output shaft of the engine.

18. The drive train for a hybrid vehicle according to claim 16, wherein said rotor shaft is centered by radial contact with said input member of said transmission.

19. The drive train for a hybrid vehicle according to claim 15 wherein;

the output shaft of the engine is a crankshaft;

the input member of the transmission is a torque, converter; and said rotor is centered by radial contact with the crankshaft and with said torque converter.

20. The drive train for a hybrid vehicle according to claim 15 wherein said rotor comprises a hollow shaft portion having inner and outer cylindrical surfaces and wherein said outer cylindrical surface is in direct contact with and supported by the output shaft of the engine and said inner cylindrical surface is in direct contact with and supported by a member fixed to and extending axially from said input member of the transmission.

* * * * *